US007558814B2

(12) United States Patent
Lee et al.

(10) Patent No.: US 7,558,814 B2
(45) Date of Patent: Jul. 7, 2009

(54) REALIZATION METHOD OF SELF-EQUALIZED MULTIPLE PASSBAND FILTER

(75) Inventors: Ju-Seop Lee, Daejon (KR); Man-Seok Uhm, Daejon (KR); In-Bok Yom, Daejon (KR); Jong-Heung Park, Daejon (KR)

(73) Assignee: Electronics and Telecommunications Research Institute (KR)

( * ) Notice: Subject to any disclaimer, the term of this patent is extended or adjusted under 35 U.S.C. 154(b) by 771 days.

(21) Appl. No.: 11/027,832

(22) Filed: Dec. 30, 2004

(65) Prior Publication Data

US 2007/0005308 A1 Jan. 4, 2007

(30) Foreign Application Priority Data

Jul. 16, 2004 (KR) ...................... 10-2004-0055375

(51) Int. Cl.
*G06F 17/10* (2006.01)

(52) U.S. Cl. ...................................................... 708/300

(58) Field of Classification Search .................. 708/300
See application file for complete search history.

(56) References Cited

U.S. PATENT DOCUMENTS 3,969,692 A * 7/1976 Williams et al. ............ 333/212
6,882,251 B2 * 4/2005 Yu et al. ...................... 333/202

FOREIGN PATENT DOCUMENTS

| | | | |
|---|---|---|---|
| JP | 09-130207 | | 5/1997 |
| JP | 10-308650 | | 11/1998 |
| KR | 1020030039124 | A | 5/2003 |
| KR | 1020050045438 | A | 5/2005 |
| WO | WO-01/43285 | A2 | 6/2001 |

OTHER PUBLICATIONS

Stephen Holme, et al., Multiple Passband Filters for Satellite Applications, 20th AIAA ICSSC (2002), Paper No. AIAA-2002-1993, 2002.
Juseop Lee, et al., A Dual-Mode Canonical Filter with Dual-Passband for Satellite Transponder, Korea Electromagnetic Engineering Society, vol. 15, No. 3, pp. 278-283, Mar. 2004.
Man Seok Uhm, et al., A Study on the Synthesis of Dual-Mode Asymetric Canonical Filter, Korea Electromagnetic Engineering Society, vol. 14, No. 6, pp. 599-605, Jun. 2003.

* cited by examiner

*Primary Examiner*—David H Malzahn
(74) *Attorney, Agent, or Firm*—Blakely, Sokoloff, Taylor & Zafman

(57) ABSTRACT

A realization method of a multiple passband filter that equalizes a group delay without using an external equalizer is disclosed. The realization method includes the steps of: a) calculating a transfer function based on poles and zeros; b) extracting an input/output coupling coefficient and a coupling matrix from the calculated transfer function as a network parameter; and c) physically designing and realizing elements of the filter to have the extracted network parameter.

6 Claims, 11 Drawing Sheets

SYMMETRIC CANONICAL STRUCTURE

ASYMMETRIC CANONICAL STRUCTURE

REALIZATION METHOD OF SELF-EQUALIZED MULTIPLE PASSBAND FILTER

FIELD OF THE INVENTION

The present invention relates to a realization method of a self-equalized multiple passband filter; and, more particularly, to a realization method of a self-equalized multiple passband filter having self-equalized group delay characteristics without using an external equalizer.

DESCRIPTION OF THE PRIOR ART

Generally, a microwave filter has characteristics of single passband and plural of cut-off bands at each side of the passband. The microwave filter having the single passband characteristic is classified to a butterworth response filter, a chebyshev response filter and an elliptic response filter based on its response characteristic. The above mentioned microwave filters disclosed at various books and articles including a book by D. M. Pozar, entitled "Microwave Engineering", Addision-Wesley, 1993. Ch. 9 and another book by J. A. G. Malherbe, entitled "Microwave Transmission Line Filters", Artech House. 1979.

However, a filter having multiple passbands has been required according to configurations of communication systems. Particularly, in certain satellite communication systems, non-contiguous channel signals are amplified by an amplifier and the amplified signals are transmitted through one beam to the ground according to a channel allocation and a satellite antenna coverage.

FIG. 1 is a view illustrating a satellite communication system having multi-beam/frequency coverages.

As shown in FIG. 1, satellite communication system may require a microwave filter having two passbands and three cut-off bands.

The microwave filter having multiple passband characteristics is disclosed by Holme in an article entitled "Multiple passband filters for satellite applications", $20^{th}$ AIAA International Communication Satellite Systems Conference and Exhibit, Paper No., ATAA-2002-1993, 2002.

Generally, an elliptic response filter has superior frequency selectivity and accordingly, it has been widely used as a channel filter for satellite transponders. Holme introduced a method for designing a multiple passbands filter having an elliptic response passband because a filter having multiple passband characteristics is appropriate for the satellite transponder. If the each passband is designed to have an elliptic response, transmission zeros are located in the cut-off band. By using the transmission zeros, the cut-off band can be formed in a middle of a single passband. Accordingly, the filter can be designed to have the multiple passband characteristics by forming the cut-off band in the middle of the single passband. The elliptic response type can be simply designed and have superior frequency selection characteristics comparing to the butterworth response type or the chebyshev response type. So, Holme introduced the method for designing the multiple passband filter having elliptic response.

The filter having the multiple passband characteristics introduced by Holme is a dual-mode in-line type filter which can be easily manufactured, tuned and integrated. Here, each physical resonator of the dual-mode filter provides two electrical resonances. That is, the nth-order dual-mode filter can be realized with n/2 physical resonators. The dual-mode filter was introduced by Williams in an article entitled "A four-cavity elliptic waveguide filter", IEEE Trans. On Microwave Theory and Techniques, vol. 18, no. 12, pp. 1109-1114, December 1970. The dual-mode filter of Williams was designed to have an input end and an output end arranged in opposite sides and to be of the in-line type.

FIG. 2 is a graph showing frequency characteristics of 8th-order filter having four transmission zeros and two elliptic response passbands.

The above-mentioned in-line structure 8th-order filter can realize maximum four transmission zeros. Therefore, it is physically impossible to realize a filter having the in-line structure to provide six transmission zeros.

Also, the filter introduced by Holme is an in-line structure filter having dual passbands characteristic and it is an 8th-order filter having each passband has 4th-order elliptic response characteristics. It is designed to provide four transmission zeros.

Therefore, the filter with the in-line structure may not be able to realize all the transmission zeros generated in the filter's transfer function.

For overcoming the drawback of the in-line structure filter, a multiple passband filter having a canonical structure which can realize more transmission zeros than an in-line structure filter was introduced in an article entitled "A dual-passband filter of canonical structure for satellite applications", IEEE Microwave and Wireless Components Letters, vol. 14, no. 6, pp. 271-273, 2004.

An nth-order canonical structure filter can provide maximum n-2 transmission zeros and it can generally provide more transmission zeros than the in-line structure filter.

FIG. 3 is a graph showing frequency responses of a 6th-order filter having four transmission zeros and two elliptic response passbands.

The frequency response shown in FIG. 3 cannot be realized by the 6th-order in-line structure filter but the canonical structure filter can provide the frequency response shown in FIG. 3.

Meanwhile, both of the in-line structure and canonical structure multiple passband filter with elliptic response have superior frequency selectivity. However, both of the filters have a large bit error rate (BER) in digital data transmission because of the large variation of group delay.

The above-mentioned drawback can be overcome by additionally attaching an external equalizer in the filters. However, it is very complicated to design the external equalizer in case of the multiple passband filters having elliptic response.

SUMMARY OF THE INVENTION

It is, therefore, an object of the present invention to provide a realization method of a self-equalized multiple passband filter that equalizes group delays by using a number of complex transmission zeros without using an external equalizer.

It is another object of the present invention to provide a realization method of a multiple passband filter having self-equalized group delay characteristics, the realization method including the steps of: a) calculating a transfer function of the filter based on pole/zero locations; b) extracting an input/output coupling coefficient and a coupling matrix from the calculated transfer function as a network parameter; and c) physically designing and realizing elements of the filter to have the extracted network parameter.

BRIEF DESCRIPTION OF THE DRAWINGS

The above and other objects and features of the present invention will become apparent from the following description of the preferred realizations given in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings.

A transfer function t(s) represents a frequency characteristic of a filter where the present invention is applied. The transfer function t(s) is expressed as a following equation:

$$t^2(s) = \frac{1}{1+\varepsilon^2 R^2(s)} \quad \text{(Eq. 1)}$$

In the Eq. 1, s is a normalized complex frequency, R(s) is a characteristic function representing a characteristic of the filter, and ε is a ripple constant representing a passband ripple characteristic of the filter.

A response characteristic of a filter is categorized into a butterworth response, a chebyshev response, or an elliptic response according to the characteristic function.

And, implementation of transmission zeros is required in the multiple passband filter and the elliptic response type is a common response type of a filter having transmission zeros. The characteristics function R(s) is expressed as a rational function. A following equation is the characteristic function R(s) representing the elliptic response.

$$R(s) = \frac{\prod_i (s - s_{pi})}{\prod_k (s - s_{zk})} \quad \text{(Eq. 2)}$$

In Eq. 2, $s_p$ and $s_z$ are the pole and zero of the filter, respectively.

In a case of a filter having single elliptic response passband, all poles are located within passband and all zeros are located out-of passband. That is, the zeros are located in cut-off bands and it makes the filter to have elliptic response characteristic.

Meanwhile, a filter can be designed to have multiple passband characteristics by placing the zeros at each side of passbands in case of a filter having multiple passbands characteristics of the elliptic response type.

Figure 1:
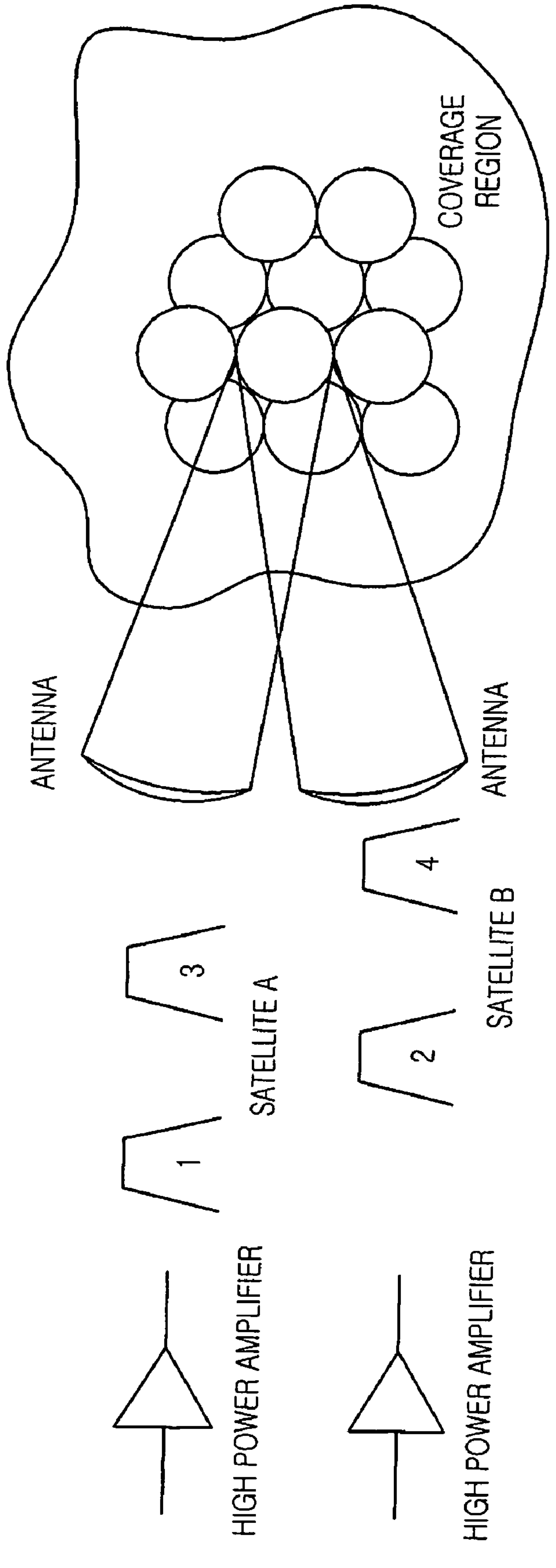
FIG. 1 (PRIOR ART)
FIG. 1 is a view illustrating a satellite communication system having multi-beam/frequency coverages.
Figure 2:
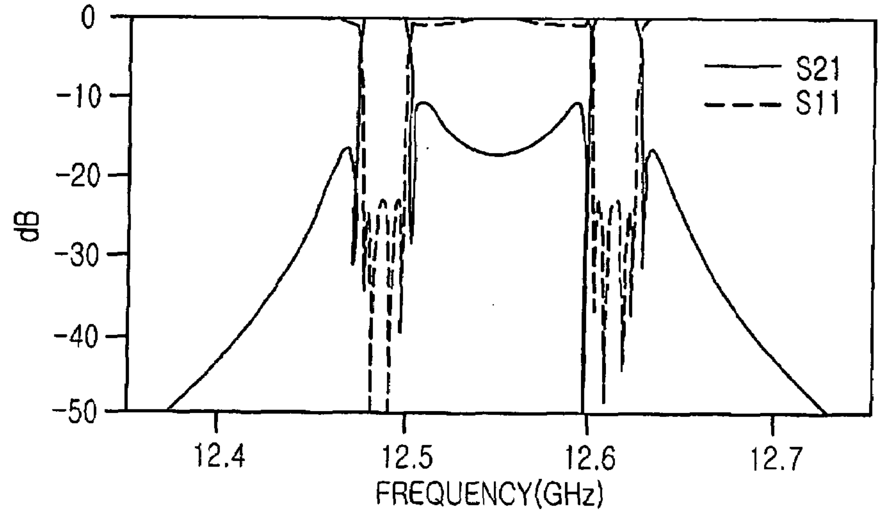
FIG. 2 (PRIOR ART)
FIG. 2 is a graph showing frequency response of the 8th-order filter having four transmission zeros and two elliptic response passbands.
Figure 3:
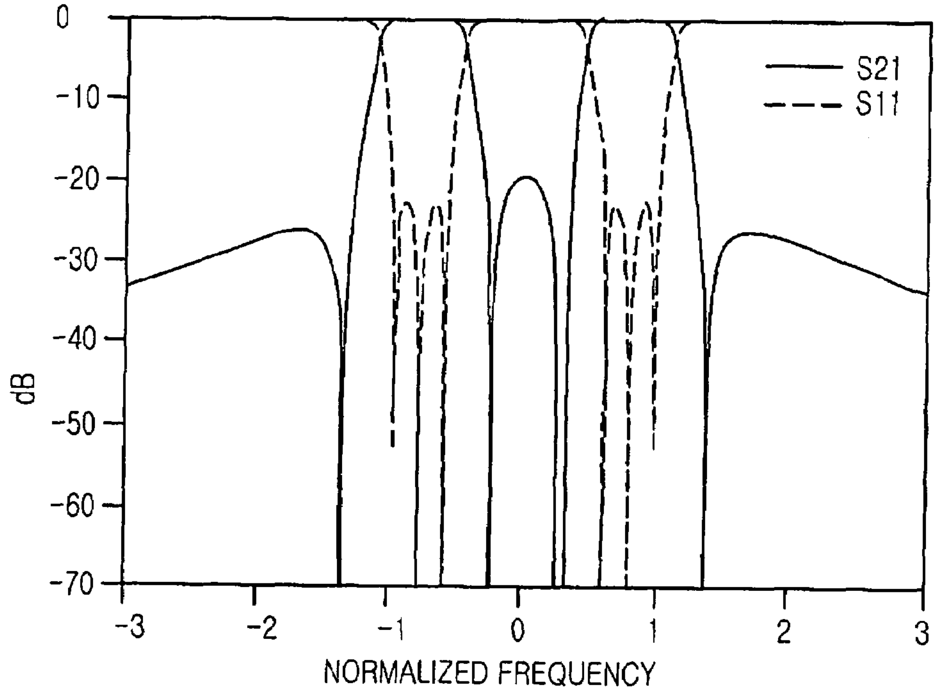
FIG. 3 (PRIOR ART)
FIG. 3 is a graph showing frequency response of the 6th-order filter having four transmission zeros and two elliptic response passbands.
Figure 4A:
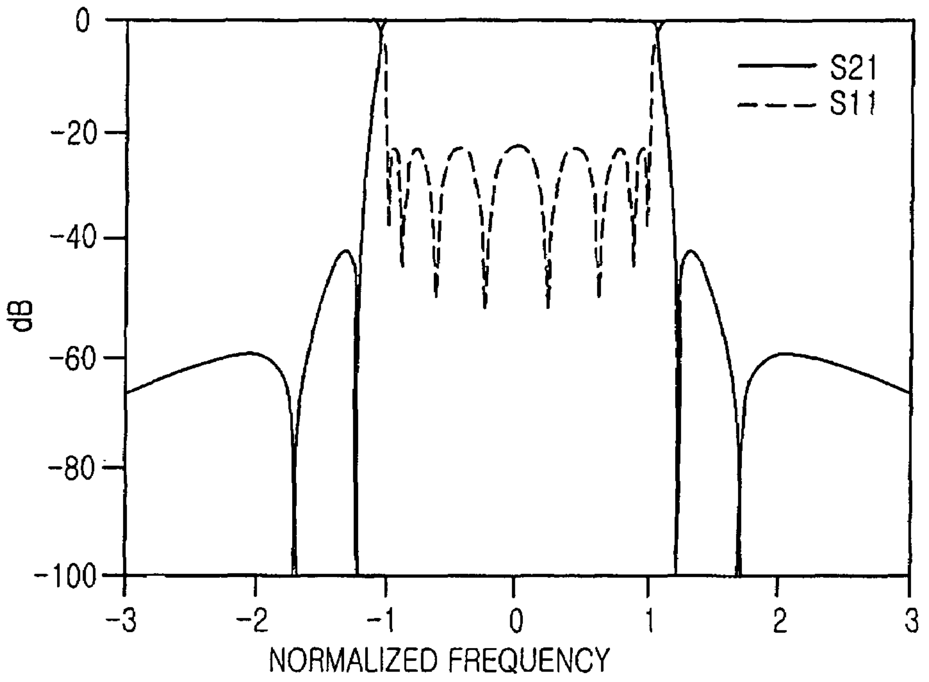
FIGS. 4A to 4C are graphs showing a frequency response characteristic, a group delay characteristic and pole/zero locations of an 8th-order filter having one elliptic response passband.
Figure 4B:
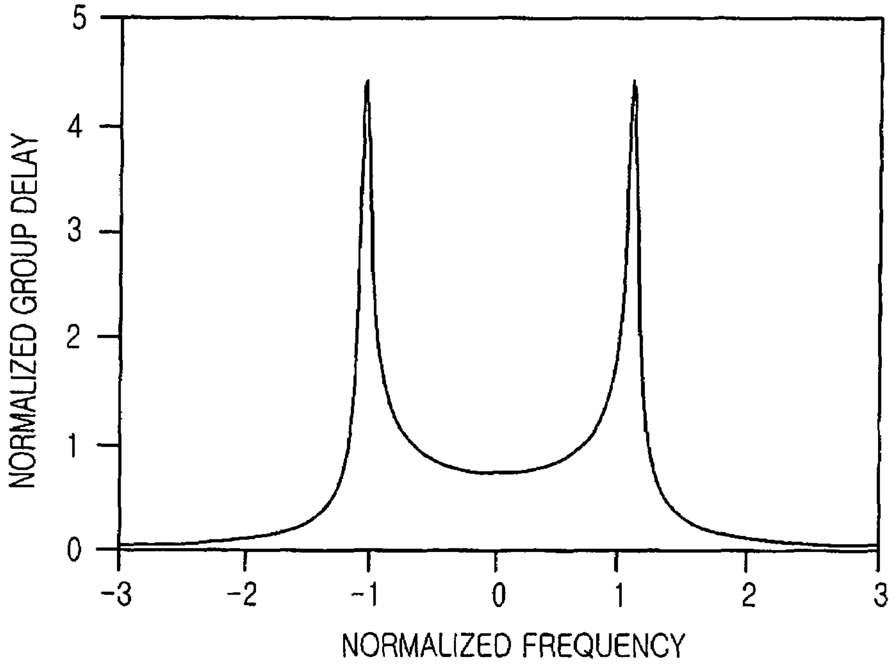
Figure 4C:
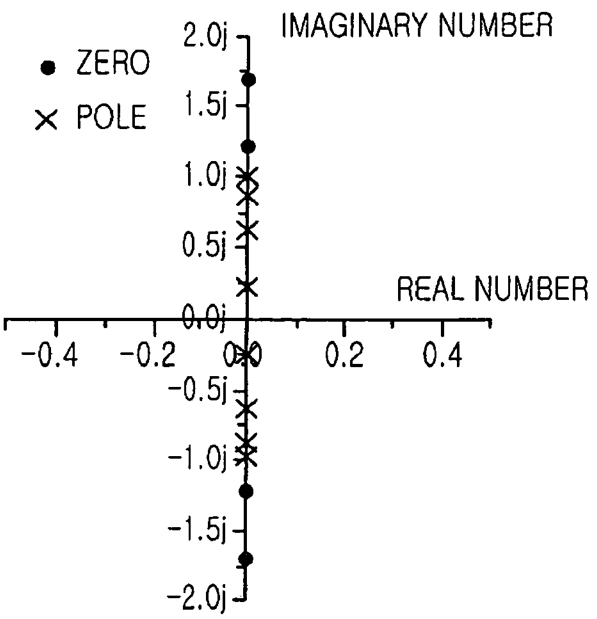

FIGS. 4A, 4B and 4C are graphs showing a frequency response characteristic, a group delay characteristic and pole/zero location of an 8th-order filter having one elliptic response passband.

As shown in FIG. 4C, poles and zeros are located at pure imaginary axis on normalized complex frequency domain.

A filter can be designed to have the elliptic response multiple passband characteristic by placing the zeros at each side of passbands.

Figure 5A:
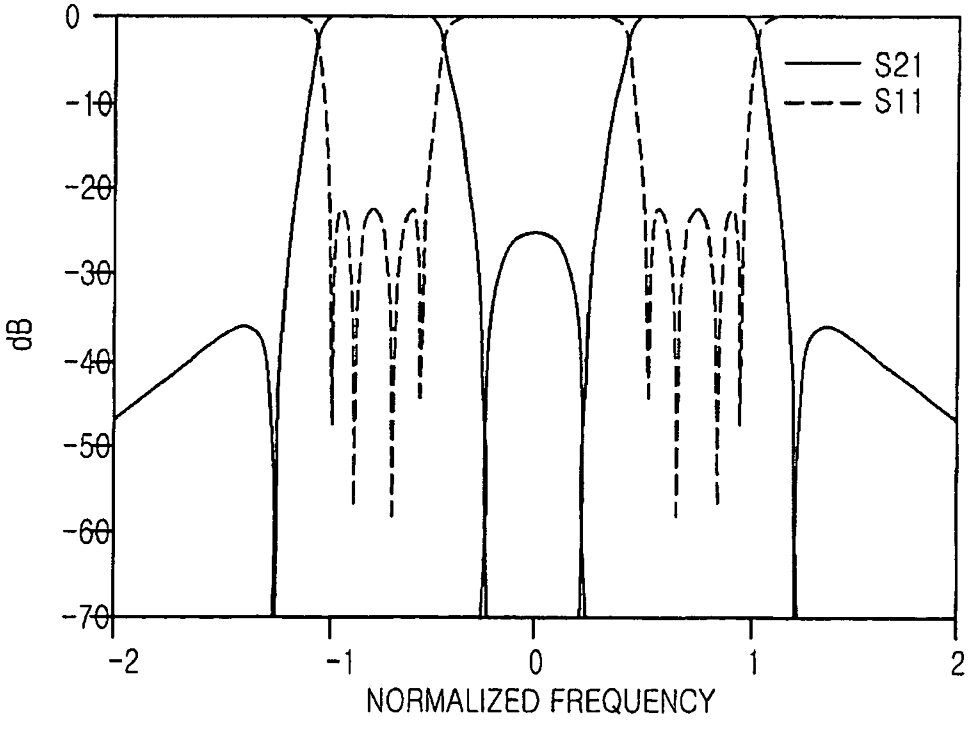
FIGS. 5A to 5C are graphs showing a frequency response characteristic, a group delay characteristic and pole/zero locations of an 8th-order filter having two elliptic response passbands, where each passband has a 4th-order elliptic response.
Figure 5B:
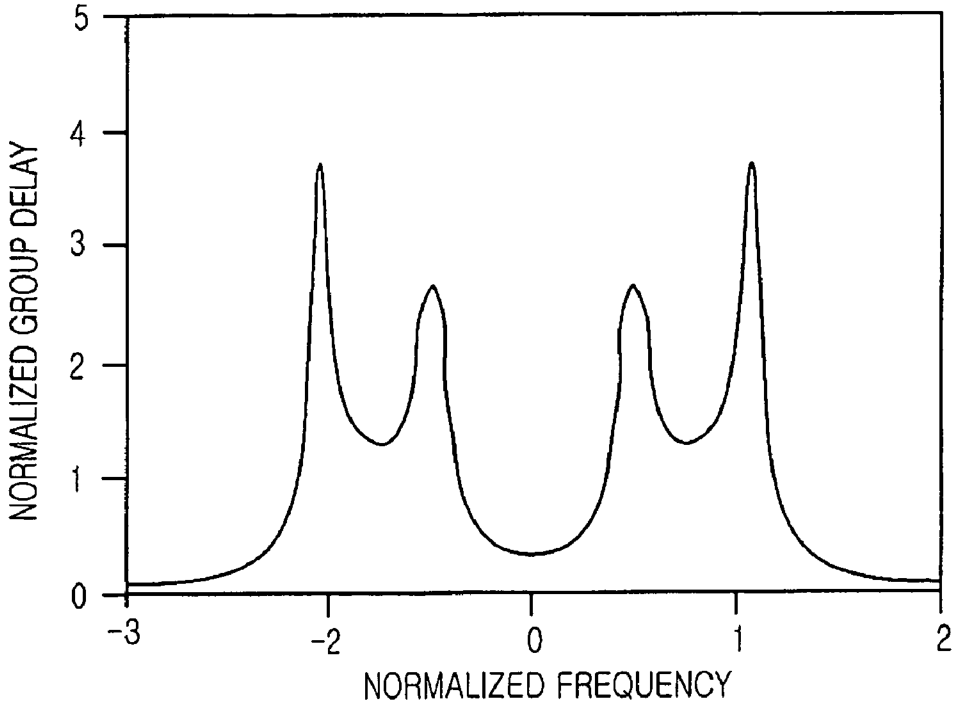
Figure 5C:
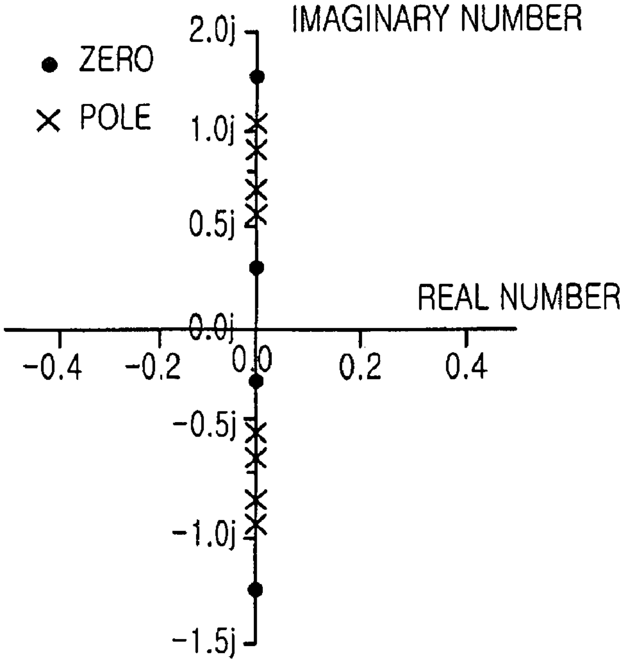

FIGS. 5A, 5B and 5C are graphs showing a frequency response characteristic, a group delay characteristic and pole/zero location of an 8th-order filter having two elliptic response passbands, where each passband has a 4th-order elliptic response.

As shown in FIG. 5C, both of the poles and the zeors also are located at pure imaginary axis on normalized complex frequency domain in case of the multiple passband filters.

As shown in FIGS. 4B and 5B, there is large variation of group delay in a passband in case of the filter having elliptic response passbands. Therefore, the group delay needs to be equalized by using complex transmission zeros of a transfer function.

Figure 6A:
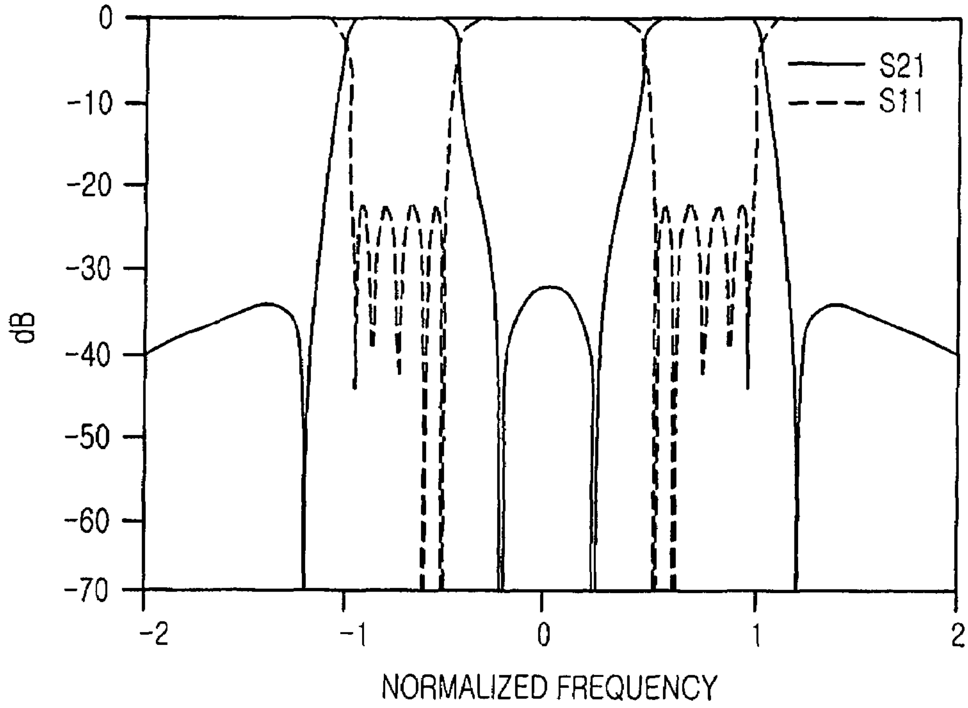
FIGS. 6A to 6C are graphs showing a frequency response characteristic, a group delay characteristic and pole/zero locations of a 10th-order filter having two elliptic response passbands, where each passband has a 5th-order elliptic response.
Figure 6B:
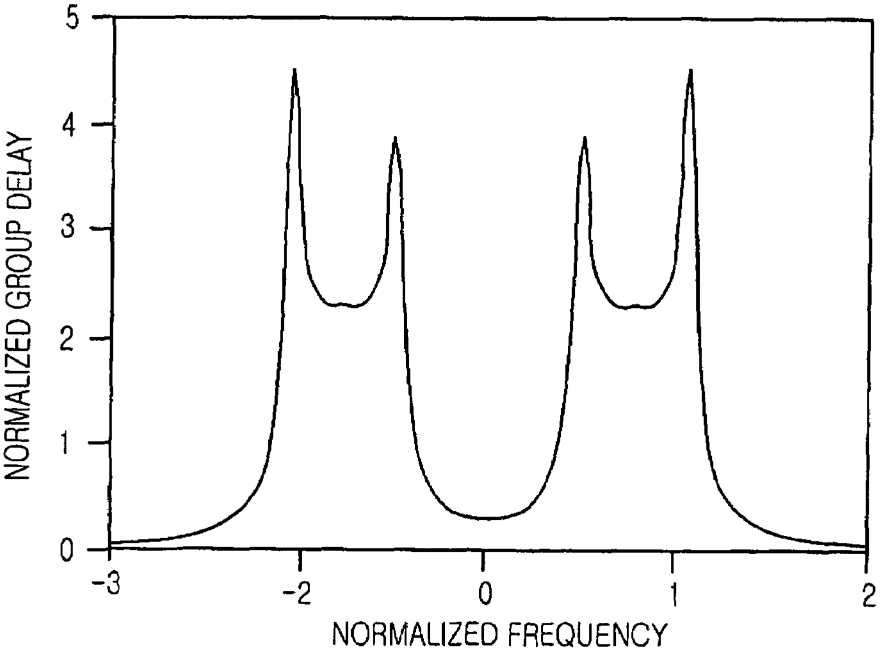
Figure 6C:
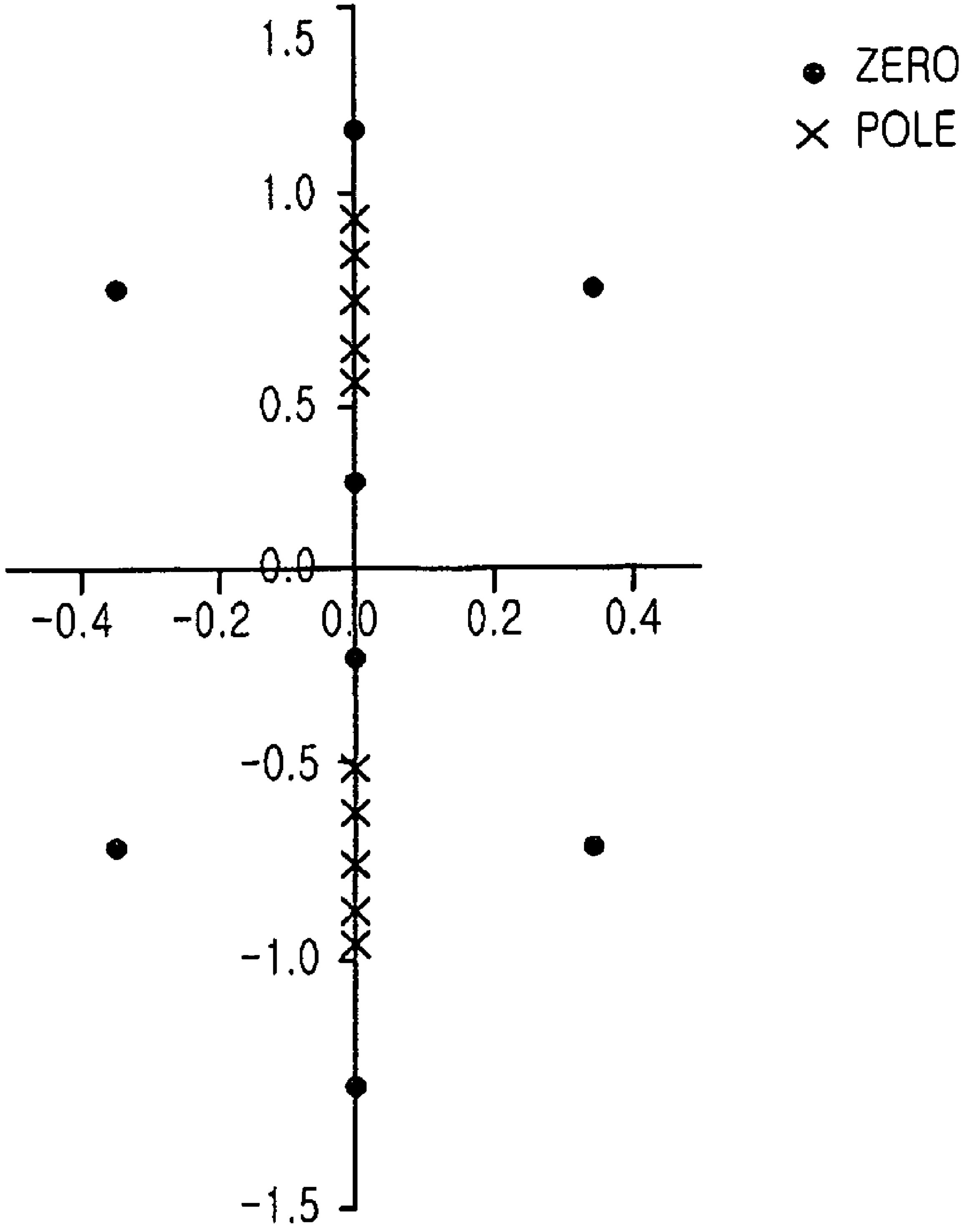

FIGS. 6A, 6B and 6C are graphs showing a frequency response characteristic, a group delay characteristic and pole/zero location of a 10th-order filter having two self-equalized elliptic response type passbands.

As shown in FIG. 6B, the graph shows that the group delay is equalized by the complex transmission zeros within each passband.

Herein, for obtaining a desired response characteristic of the filter, locations of poles and zeros are decided by optimization procedure and the filter can be realized by obtaining network parameters after computing a transfer function of the filter based on the location of poles and zeros.

Hereinafter, a realization method of a multiple passband canonical filter in accordance with a preferred embodiment of the present invention is explained. The preferred embodiment of the present invention is explained to realize the multiple passband canonical filters by obtaining a network parameter from a transfer function of the filter having characteristics shown in FIGS. 6A, 6B and 6C. However, the preferred embodiment of the present invention can be used for realizing not only a 10th-order filter having two passbands but also nth-order filter having multiple passbands.

The filter having characteristics shown in FIGS. 6A, 6B and 6C cannot be realized by the in-line structure filter because the transfer function has eight transmission zeros. However, it can be realized by a symmetric canonical structure filter or an asymmetric canonical structure filter. The filter having a canonical structure is classified into the symmetric canonical structure filter and the asymmetric canonical structure filter. Furthermore, paths of the signal are different according to type of canonical structure and the signal paths are shown in FIG. 7.

Figure 7:
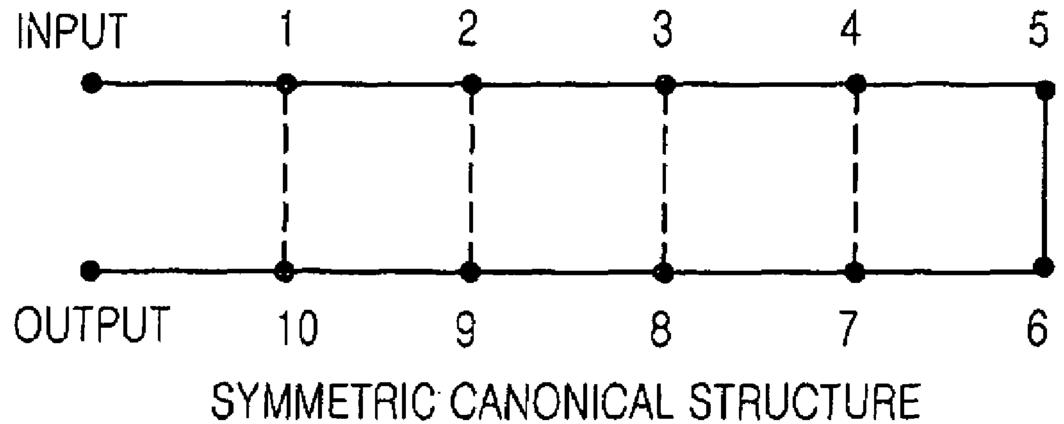
FIG. 7 is a view showing a signal path of a 10th-order symmetric canonical filter and a signal path of a 10th-order asymmetric canonical filter.
Figure 7:
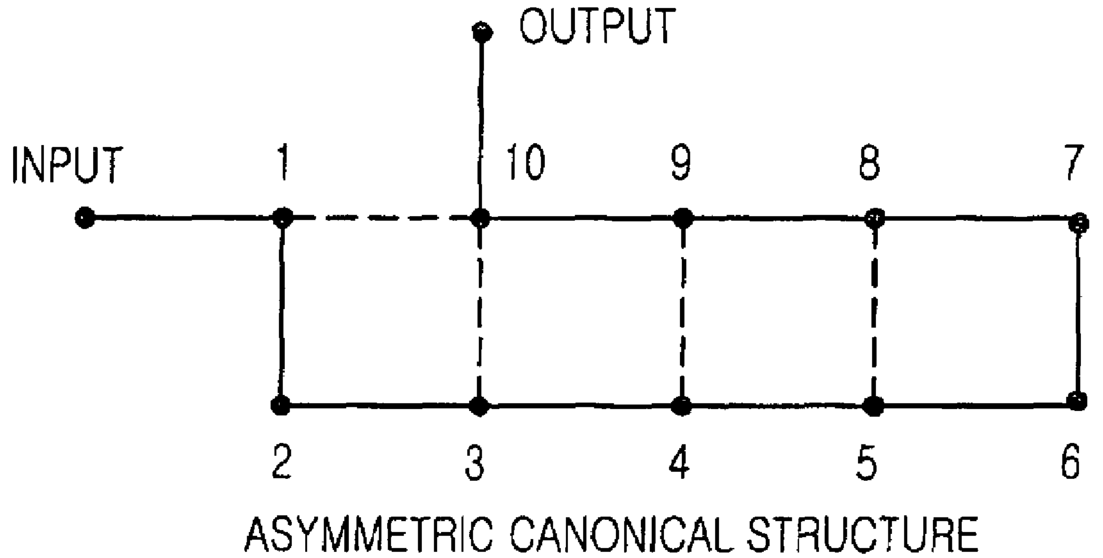
Figure 7:
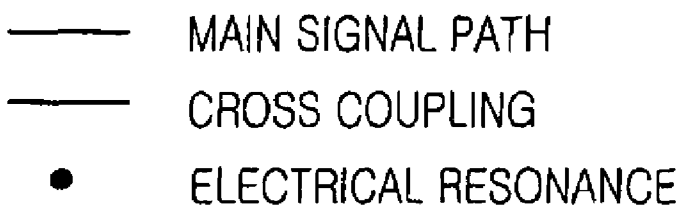

FIG. 7 is a view showing signal paths of a 10th-order symmetric canonical filter and a 10th-order asymmetric canonical filter.

In FIG. 7, a solid line represents a main signal path and a dotted line represents a cross coupling.

Figure 8:
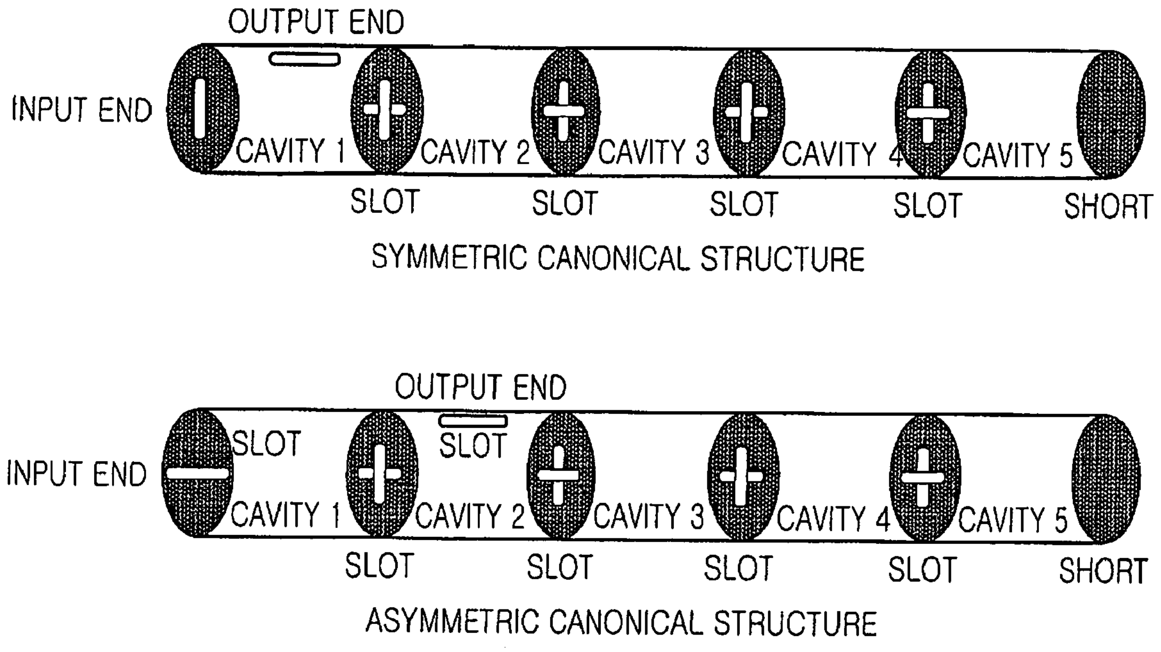
FIG. 8 is a diagram illustrating a structure of a 10-order filter in accordance with a preferred embodiment of the present invention.

FIG. 8 is a view showing a structure of a 10th-order filter realized based on the FIG. 7. That is, FIG. 8 shows a dual-mode 10th-order filter using cylindrical cavity resonators. As shown, an input port and an output port are differently positioned according to the symmetric structure and the asymmetric structure.

Hereinafter, calculation of a network parameter is explained according to the symmetric structure and the asymmetric structure.

The transfer function t(s) of the filter having the response characteristic shown in FIG. 6*a* is obtained based on pole/zero location and the transfer function t(s) can be expressed as Eq. 3. And, generalized equation for an nth-order filter is shown in Eq. 4.

$$t(s)=\frac{1}{\varepsilon}\frac{s^8+a_{z6}s^6+a_{z4}s^4+a_{z2}s^2+a_{z0}}{s^{10}+a_{p9}s^9+a_{p8}s^8+a_{p7}s^7+a_{p6}s^6+a_{p5}s^5+a_{p4}s^4+a_{p3}s^3+a_{p2}s^2+a_{p1}s+a_{p0}} \quad \text{(Eq. 3)}$$

In Eq. 3, s=jω, $a_{z6}$=2.489, $a_{z4}$=1.980, $a_{z2}$=0.790 and a0=0.042, $a_{p9}$=1.054, $a_{p8}$=3.664, $a_{p7}$=2.829, $a_{p6}$=4.810, $a_{p5}$=2.618, $a_{p4}$=2.783, $a_{p3}$=0.972, $a_{p2}$=0.696, $a_{p1}$=0.120, and $a_{p0}$=0.059.

$$t(s)=\frac{1}{\varepsilon}\frac{\sum_{j=0}^{n}a_{zj}s^j}{\sum_{i=0}^{n}a_{pi}s^i} \quad \text{(Eq. 4)}$$

In Eq. 4, s=jω, $a_{zj}$ and $a_{pi}$ are complex numbers.

A coupling matrix ($M_1$) and an input/output coupling coefficients ($R_{in}$, $R_{out}$), which are the network parameters, are obtained from the transfer function of the filter as shown in Eq. 5 and its generalized equation for the nth-order filter is shown in Eq. 6.

$$M_1=\begin{bmatrix} 0 & 0.8374 & 0 & 0 & 0 & 0 & 0 & 0 & 0 & -0.0319 \\ 0.8374 & 0 & 0.3957 & 0 & 0 & 0 & 0 & 0 & 0.0230 & 0 \\ 0 & 0.3957 & 0 & 0.7362 & 0 & 0 & 0 & 0.0206 & 0 & 0 \\ 0 & 0 & 0.7362 & 0 & 0.2859 & 0 & 0.1028 & 0 & 0 & 0 \\ 0 & 0 & 0 & 0.2859 & 0 & 0.6407 & 0 & 0 & 0 & 0 \\ 0 & 0 & 0 & 0 & 0.6407 & 0 & 02852 & 0 & 0 & 0 \\ 0 & 0 & 0 & 0.1028 & 0 & 0.2852 & 0 & 0.7362 & 0 & 0 \\ 0 & 0 & 0.0206 & 0 & 0 & 0 & 0.7362 & 0 & 0.3957 & 0 \\ 0 & 0.0230 & 0 & 0 & 0 & 0 & 0 & 0.3957 & 0 & 0.8374 \\ -0.0319 & 0 & 0 & 0 & 0 & 0 & 0 & 0 & 0.8374 & 0 \end{bmatrix} \quad \text{(Eq. 5)}$$

$$R_{in}=R_{out}=0.5276$$

$$M_1=\begin{bmatrix} m_{11} & m_{12} & 0 & 0 & \Lambda & \Lambda & 0 & 0 & 0 & m_{1,n} \\ m_{21} & m_{22} & m_{23} & 0 & \Lambda & \Lambda & 0 & 0 & m_{2,n-2} & 0 \\ 0 & m_{32} & m_{33} & m_{34} & \Lambda & \Lambda & 0 & m_{3,n-3} & 0 & 0 \\ 0 & 0 & m_{43} & m_{44} & \Lambda & \Lambda & m_{4,n-4} & 0 & 0 & 0 \\ 0 & 0 & 0 & M & O & N & M & M & 0 & 0 \\ 0 & 0 & 0 & M & N & O & M & M & M & M \\ 0 & 0 & 0 & m_{n-3,4} & \Lambda & \Lambda & m_{n-3,n-3} & m_{n-3,n-2} & 0 & 0 \\ 0 & 0 & m_{n-2,3} & 0 & \Lambda & \Lambda & m_{n-2,n-3} & m_{n-2,n-2} & m_{n-2,n-1} & 0 \\ 0 & m_{n-1,2} & 0 & 0 & \Lambda & \Lambda & 0 & m_{n-1,n-2} & m_{n-1,n-1} & m_{n-1,n} \\ m_{n,1} & 0 & 0 & 0 & \Lambda & \Lambda & 0 & 0 & m_{n,n-1} & m_{n,n} \end{bmatrix} \quad \text{(Eq. 6)}$$

$$R_{in}=r_1,\ R_{out}=r_2$$

In Eq. 6, $m_{ij}$ is a complex number and $r_1$ and $r_2$ are real numbers.

The network parameter of the asymmetric canonical filter can be obtained by using a plane rotation of the matrix.

Generally, the network parameter of the symmetric canonical filter can be obtained easily, compared to the network parameter of the asymmetric canonical filter. Accordingly, the network parameter of the asymmetric canonical filter is obtained by applying the plane rotation to the matrix of the symmetric canonical filter.

A coupling matrix ($M_2$) and an input/output coupling coefficients ($R_{in}$, $R_{out}$), which are the network parameters of the asymmetric canonical filter, are obtained by applying the plane rotation to the network parameters of the symmetric canonical filter. It is shown in Eq. 7 and it's generalized equation for the nth-order filter is shown in Eq. 8.

$$M_2 = \begin{bmatrix} 0 & 0.8374 & 0 & 0 & 0 & 0 & 0 & 0 & 0 & 0.0319 \\ 0.8374 & 0 & 0.3964 & 0 & 0 & 0 & 0 & 0 & 0 & 0 \\ 0 & 0.3964 & 0 & 0.7362 & 0 & 0 & 0 & 0 & 0 & 0.0486 \\ 0 & 0 & 0.7362 & 0 & 0.3026 & 0 & 0 & 0 & 0.0194 & 0 \\ 0 & 0 & 0 & 0.3206 & 0 & 0.7006 & 0 & -0.3172 & 0 & 0 \\ 0 & 0 & 0 & 0 & 0.7006 & 0 & 0.0376 & 0 & 0 & 0 \\ 0 & 0 & 0 & 0 & 0 & 0.0376 & 0 & 0.6564 & 0 & 0 \\ 0 & 0 & 0 & 0 & -0.3172 & 0 & 0.6564 & 0 & 0.3957 & 0 \\ 0 & 0 & 0 & 0.0194 & 0 & 0 & 0 & 0.3957 & 0 & 0.8360 \\ 0.0319 & 0 & -0.0486 & 0 & 0 & 0 & 0 & 0 & 0.8360 & 0 \end{bmatrix} \quad \text{(Eq. 7)}$$

$$R_{in} = R_{out} = 0.5276$$

$$M_2 = \begin{bmatrix} m_{11} & m_{12} & 0 & 0 & 0 & 0 & \Lambda & \Lambda & 0 & 0 & 0 & m_{1,n} \\ m_{21} & m_{22} & m_{23} & 0 & 0 & 0 & \Lambda & \Lambda & 0 & 0 & 0 & 0 \\ 0 & m_{32} & m_{33} & m_{34} & 0 & 0 & \Lambda & \Lambda & 0 & 0 & 0 & m_{3n} \\ 0 & 0 & m_{43} & m_{44} & m_{45} & 0 & \Lambda & \Lambda & 0 & 0 & m_{4,n-1} & 0 \\ 0 & 0 & 0 & m_{54} & m_{55} & m_{56} & \Lambda & \Lambda & 0 & m_{5,n-2} & 0 & 0 \\ 0 & 0 & 0 & 0 & m_{65} & m_{66} & \Lambda & \Lambda & m_{6,n-3} & 0 & 0 & 0 \\ M & M & M & M & M & M & O & N & M & M & M & M \\ M & M & M & M & M & M & N & O & M & M & M & M \\ 0 & 0 & 0 & 0 & 0 & m_{n-3,6} & \Lambda & \Lambda & m_{n-3,n-3} & m_{n-3,n-2} & 0 & 0 \\ 0 & 0 & 0 & 0 & m_{n-2,5} & 0 & \Lambda & \Lambda & m_{n-2,n-3} & m_{n-2,n-2} & m_{n-2,n-1} & 0 \\ 0 & 0 & 0 & m_{n-1,4} & 0 & 0 & \Lambda & \Lambda & 0 & m_{n-1,n-2} & m_{n-1,n-1} & m_{n-1,n} \\ m_{n,1} & 0 & m_{n,3} & 0 & 0 & 0 & \Lambda & \Lambda & 0 & 0 & m_{n,n-1} & m_{n,n} \end{bmatrix} \quad \text{(Eq. 8)}$$

$$M_3 = \begin{bmatrix} m_{11} & m_{12} & 0 & 0 & \Lambda & \Lambda & 0 & 0 & 0 & m_{1,n-2} & 0 & m_{1,n} \\ m_{21} & m_{22} & m_{23} & 0 & \Lambda & \Lambda & 0 & 0 & m_{2,n-3} & 0 & 0 & 0 \\ 0 & m_{32} & m_{33} & m_{34} & \Lambda & \Lambda & 0 & m_{3,n-4} & 0 & 0 & 0 & 0 \\ 0 & 0 & m_{43} & m_{44} & \Lambda & \Lambda & m_{4,n-5} & 0 & 0 & 0 & 0 & 0 \\ M & M & M & M & O & N & M & M & M & M & M & M \\ M & M & M & M & N & O & M & M & M & M & M & M \\ 0 & 0 & 0 & m_{n-5,4} & \Lambda & \Lambda & m_{n-5,n-5} & m_{n-5,n-4} & 0 & 0 & 0 & 0 \\ 0 & 0 & m_{n-4,3} & 0 & \Lambda & \Lambda & m_{n-4,n-5} & m_{n-4,n-4} & m_{n-4,n-3} & 0 & 0 & 0 \\ 0 & m_{n-3,2} & 0 & 0 & \Lambda & \Lambda & 0 & m_{n-3,n-4} & m_{n-3,n-3} & m_{n-3,n-2} & 0 & 0 \\ m_{n-2,1} & 0 & 0 & 0 & \Lambda & \Lambda & 0 & 0 & m_{n-2,n-3} & m_{n-2,n-2} & m_{n-2,n-1} & 0 \\ 0 & 0 & 0 & 0 & \Lambda & \Lambda & 0 & 0 & 0 & m_{n-1,n-2} & m_{n-1,n-1} & m_{n-1,n} \\ m_{n,1} & 0 & 0 & 0 & \Lambda & \Lambda & 0 & 0 & 0 & 0 & m_{n,n-1} & m_{n,n} \end{bmatrix}$$

$$R_{in} = r_1,\ R_{out} = r_2$$

In Eq. 8, $m_{ij}$ is a complex number.

Figure 9A:
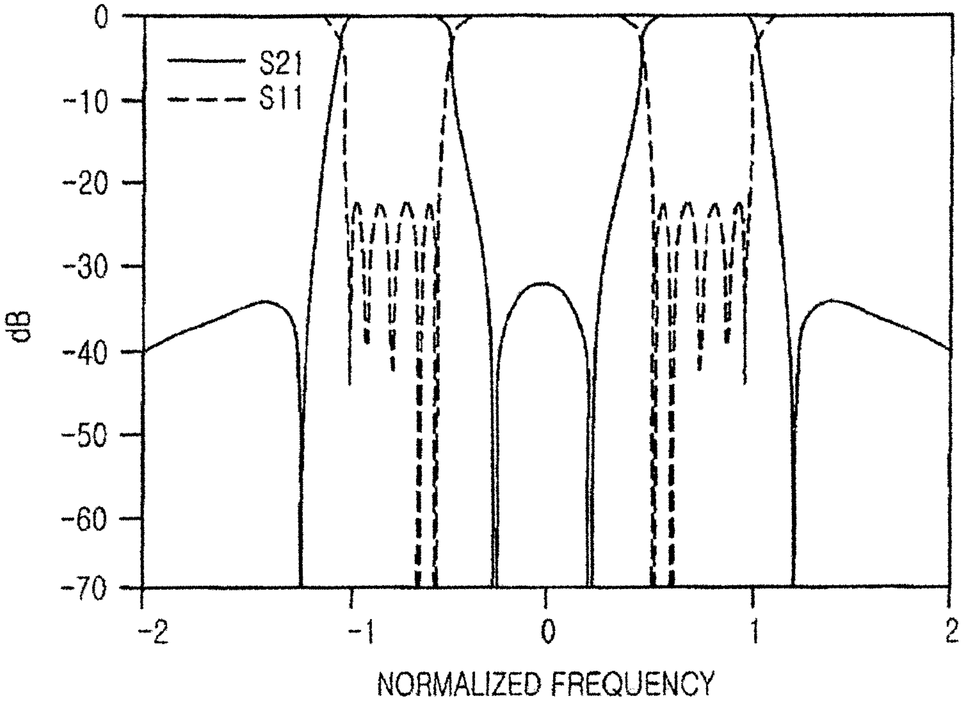
FIGS. 9A and 9B are graphs showing a frequency response characteristic and group delay characteristic of the filter having the network parameters shown in Eqs. 5 and 7.
Figure 9B:
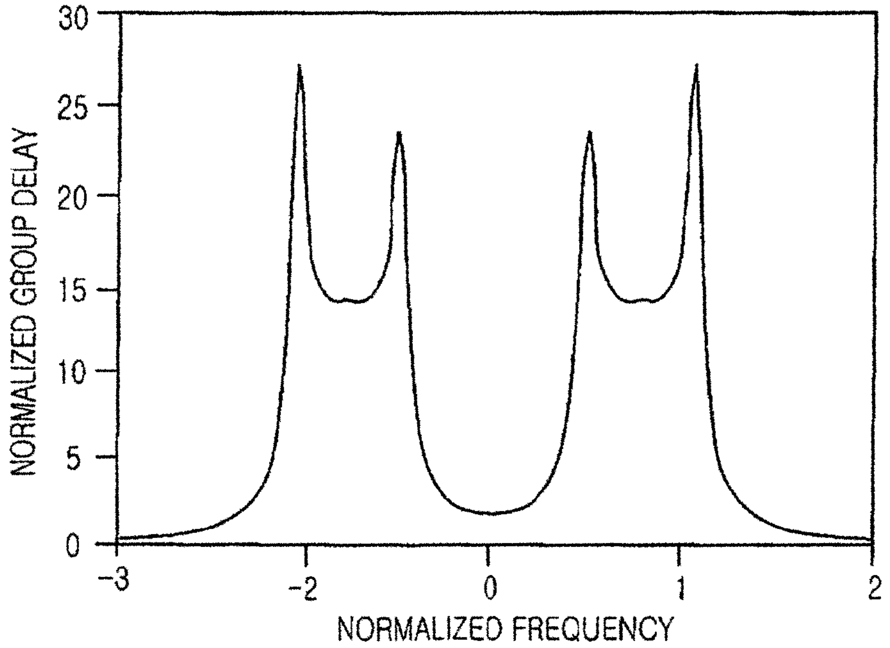

FIGS. 9A and 9B are graphs showing a frequency response characteristic and group delay characteristic of the filter having the network parameters shown in FIGS. 5 and 7.

As shown in FIG. 9A, the filter having the network parameter extracted from the transfer function has the frequency response characteristic identical to the frequency response characteristic shown in FIG. 6 and the group delay of each passband is equalized as shown in FIG. 9B.

Figure 10:
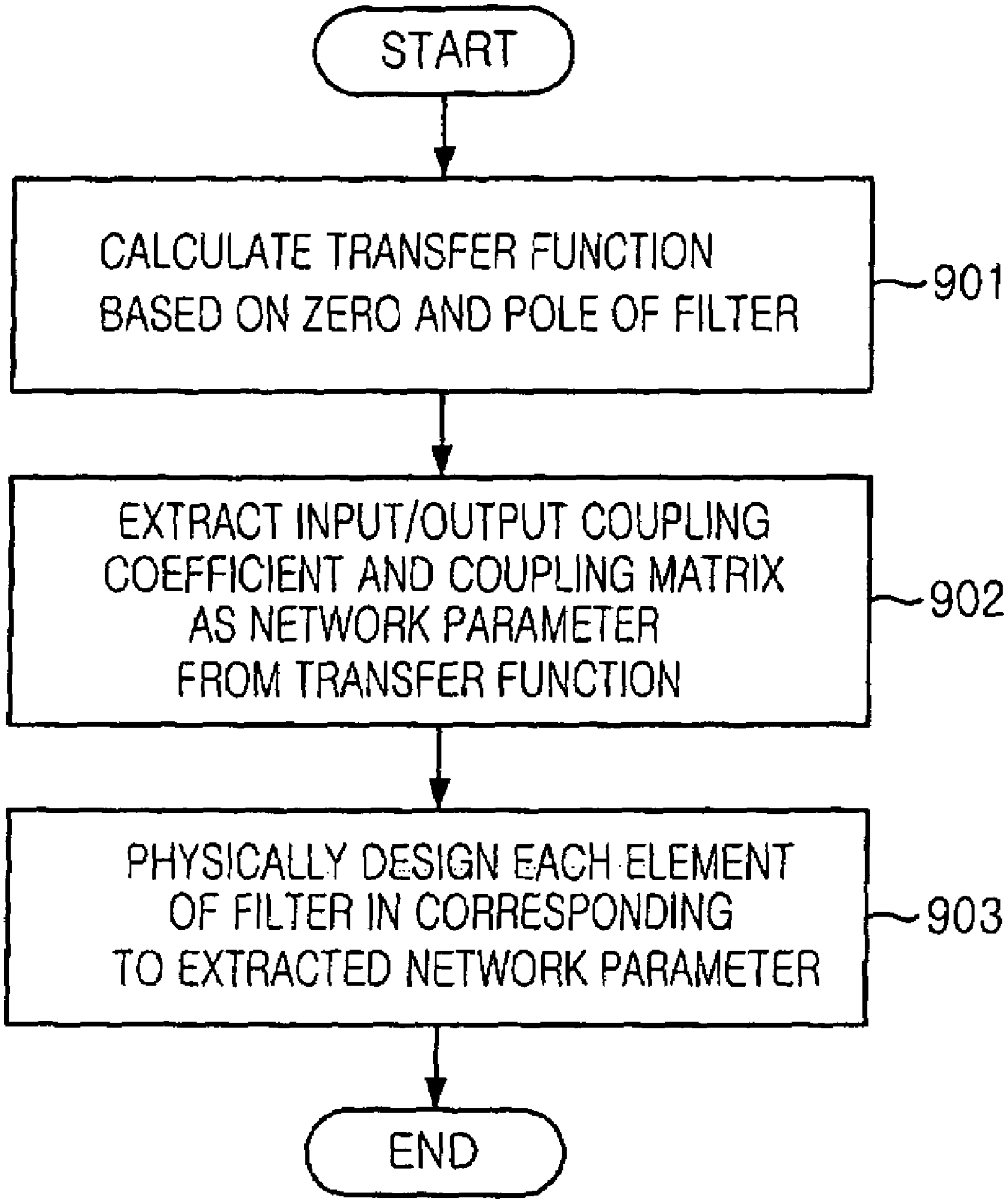
FIG. 10 is a flowchart showing a realization method of a self-equalized multiple passband filter in accordance with a preferred embodiment of the present invention.

FIG. 10 is a flowchart showing a generalized realization flow of a self-equalized multiple passband filter presented in this invention.

As shown, a transfer function is calculated based on a pole/zero of a filter at step S901. And then, an input/output coupling coefficient and a coupling matrix are extracted from the transfer function as the network parameter shown in Eqs. 4 and 6 at step S902. The network parameter of the asymmetric canonical filter is obtained by applying the plane rotation to the network parameter of the symmetric canonical filter as shown in Eq. 8.

And, each elements of the filter are physically designed and realized based on the extracted network parameters such as the input/output coupling coefficients and the coupling matrix at step S903.

As mentioned above, the above mentioned present invention can be realized as computer readable codes on a computer readable recording medium. The computer readable recording medium is any data storage device that can store data which can be thereafter read by a computer system. Examples of the computer readable recoding medium include read-only memory (ROM), random-access memory (RAM), CD-ROMs, magnetic tapes, floppy disks, optical data storage devices, and carrier waves (such as data transmission through the internet).

As mentioned above, the method of the present invention can realize the multiple passband filter having self-equalized group delay by using the complex transmission zeros from the transfer function of the multiple passband filter. Furthermore, the present invention can reduce the bit error rate in the digital data communication.

While the present invention has been described with respect to the particular realizations, it will be apparent to those skilled in the art that various changes and modifications may be made without departing from the scope of the invention as defined in the following claims.

What is claimed is:

1. A realization method of a multiple passband filter having a self-equalized group delay, the method comprising the steps of:

a) calculating a transfer function based on poles and zeros;

b) extracting input and output coupling coefficients and a coupling matrix from the calculated transfer function as network parameters; and c) physically designing and realizing elements of the filter to have the extracted network parameters.

2. The realization method as recited in claim 1, wherein locations of the poles and zeros are determined by an optimization procedure and the transfer function is calculated based on the locations of the poles and the zeros in the step a).

3. The realization method as recited in claim 2, wherein the transfer function is:

$$t(s) = \frac{1}{\varepsilon}\frac{\sum_{j=0}^{n} a_{zj}s^j}{\sum_{i=0}^{n} a_{pi}s^i},$$

where s=jω, $a_{zj}$ and $a_{pi}$ are complex numbers, and ε is a ripple constant representing a passband ripple characteristic of the filter.

4. The realization method as recited in claim 3, wherein the step b) includes the steps of:

b-1) obtaining a first set of network parameters of a symmetric canonical filter from the transfer function; and b-2) obtaining a second set of network parameters of an asymmetric canonical filter by applying a plane rotation to the obtained first set of network parameters of the symmetric canonical filter.

5. The realization method as recited in claim 4, wherein the symmetric canonical filter has the network parameters of the coupling matrix ($M_1$) and the input and output coupling coefficients ($R_{in}$, $R_{out}$) as:

$$M_1 = \begin{bmatrix} m_{11} & m_{12} & 0 & 0 & \cdots & \cdots & 0 & 0 & 0 & m_{1,n} \\ m_{21} & m_{22} & m_{23} & 0 & \cdots & \cdots & 0 & 0 & m_{2,n-2} & 0 \\ 0 & m_{32} & m_{33} & m_{34} & \cdots & \cdots & 0 & m_{3,n-3} & 0 & 0 \\ 0 & 0 & m_{43} & m_{44} & \cdots & \cdots & m_{4,n-4} & 0 & 0 & 0 \\ 0 & 0 & 0 & \vdots & \ddots & ⋰ & \vdots & \vdots & 0 & 0 \\ 0 & 0 & 0 & \vdots & ⋰ & \ddots & \vdots & \vdots & \vdots & \vdots \\ 0 & 0 & 0 & m_{n-3,4} & \cdots & \cdots & m_{n-3,n-3} & m_{n-3,n-2} & 0 & 0 \\ 0 & 0 & m_{n-2,3} & 0 & \cdots & \cdots & m_{n-2,n-3} & m_{n-2,n-2} & m_{n-2,n-1} & 0 \\ 0 & m_{n-1,2} & 0 & 0 & \cdots & \cdots & 0 & m_{n-1,n-2} & m_{n-1,n-1} & m_{n-1,n} \\ m_{n,1} & 0 & 0 & 0 & \cdots & \cdots & 0 & 0 & m_{n,n-1} & m_{n,n} \end{bmatrix}$$

$$R_{in} = r_1, \; R_{out} = r_2,$$

where $m_{ij}$ is a complex number and $r_1$ and $r_2$ are real numbers.

6. The realization method as recited in claim 4, wherein the asymmetric canonical filter has the network pararneters of the coupling matrix ($M_2$, $M_3$) and the input and output coupling coefficients ($R_{in}$, $R_{out}$)

$$M_2 = \begin{bmatrix} m_{11} & m_{12} & 0 & 0 & 0 & 0 & \cdots & \cdots & 0 & 0 & 0 & m_{1,n} \\ m_{21} & m_{22} & m_{23} & 0 & 0 & 0 & \cdots & \cdots & 0 & 0 & 0 & 0 \\ 0 & m_{32} & m_{33} & m_{34} & 0 & 0 & \cdots & \cdots & 0 & 0 & 0 & m_{3n} \\ 0 & 0 & m_{43} & m_{44} & m_{45} & 0 & \cdots & \cdots & 0 & 0 & m_{4,n-1} & 0 \\ 0 & 0 & 0 & m_{54} & m_{55} & m_{56} & \cdots & \cdots & 0 & m_{5,n-2} & 0 & 0 \\ 0 & 0 & 0 & 0 & m_{65} & m_{66} & \cdots & \cdots & m_{6,n-3} & 0 & 0 & 0 \\ \vdots & \vdots & \vdots & \vdots & \vdots & \vdots & \ddots & \iddots & \vdots & \vdots & \vdots & \vdots \\ \vdots & \vdots & \vdots & \vdots & \vdots & \vdots & \iddots & \ddots & \vdots & \vdots & \vdots & \vdots \\ 0 & 0 & 0 & 0 & 0 & m_{n-3,6} & \cdots & \cdots & m_{n-3,n-3} & m_{n-3,n-2} & 0 & 0 \\ 0 & 0 & 0 & 0 & m_{n-2,5} & 0 & \cdots & \cdots & m_{n-2,n-3} & m_{n-2,n-2} & m_{n-2,n-1} & 0 \\ 0 & 0 & 0 & m_{n-1,4} & 0 & 0 & \cdots & \cdots & 0 & m_{n-1,n-2} & m_{n-1,n-1} & m_{n-1,n} \\ m_{n,1} & 0 & m_{n,3} & 0 & 0 & 0 & \cdots & \cdots & 0 & 0 & m_{n,n-1} & m_{n,n} \end{bmatrix}$$

$$M_3 = \begin{bmatrix} m_{11} & m_{12} & 0 & 0 & \cdots & \cdots & 0 & 0 & 0 & m_{1,n-2} & 0 & m_{1,n} \\ m_{21} & m_{22} & m_{23} & 0 & \cdots & \cdots & 0 & 0 & m_{2,n-3} & 0 & 0 & 0 \\ 0 & m_{32} & m_{33} & m_{34} & \cdots & \cdots & 0 & m_{3,n-4} & 0 & 0 & 0 & 0 \\ 0 & 0 & m_{43} & m_{44} & \cdots & \cdots & m_{4,n-5} & 0 & 0 & 0 & 0 & 0 \\ \vdots & \vdots & \vdots & \vdots & \ddots & \iddots & \vdots & \vdots & \vdots & \vdots & \vdots & \vdots \\ \vdots & \vdots & \vdots & \vdots & \iddots & \ddots & \vdots & \vdots & \vdots & \vdots & \vdots & \vdots \\ 0 & 0 & 0 & m_{n-5,4} & \cdots & \cdots & m_{n-5,n-5} & m_{n-5,n-4} & 0 & 0 & 0 & 0 \\ 0 & 0 & m_{n-4,3} & 0 & \cdots & \cdots & m_{n-4,n-5} & m_{n-4,n-4} & m_{n-4,n-3} & 0 & 0 & 0 \\ 0 & m_{n-3,2} & 0 & 0 & \cdots & \cdots & 0 & m_{n-3,n-4} & m_{n-3,n-3} & m_{n-3,n-2} & 0 & 0 \\ m_{n-2,1} & 0 & 0 & 0 & \cdots & \cdots & 0 & 0 & m_{n-2,n-3} & m_{n-2,n-2} & m_{n-2,n-1} & 0 \\ 0 & 0 & 0 & 0 & \cdots & \cdots & 0 & 0 & 0 & m_{n-1,n-2} & m_{n-1,n-1} & m_{n-1,n} \\ m_{n,1} & 0 & 0 & 0 & \cdots & \cdots & 0 & 0 & 0 & 0 & m_{n,n-1} & m_{n,n} \end{bmatrix}$$

$$R_{in} = r_1, \ R_{out} = r_2,$$

where $m_{ij}$ is a complex number and $r_1$ and $r_2$ are real numbers.

* * * * *